US008775685B1

(12) United States Patent
Brebner (10) Patent No.: US 8,775,685 B1
(45) Date of Patent: Jul. 8, 2014

(54) PARALLEL PROCESSING OF NETWORK PACKETS

(75) Inventor: Gordon J. Brebner, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 190 days.

(21) Appl. No.: 13/273,087

(22) Filed: Oct. 13, 2011

(51) Int. Cl.
G06F 15/76 (2006.01)
G06F 9/46 (2006.01)
G06F 9/02 (2006.01)
G06F 17/50 (2006.01)

(52) U.S. Cl.
USPC .......................................... 709/250; 370/392

(58) Field of Classification Search
CPC ................ H04L 2209/125; H04L 2209/20; H04L 12/56
USPC .......................................... 709/250; 370/392
See application file for complete search history.

(56) References Cited

U.S. PATENT DOCUMENTS

| | | | |
|---|---|---|---|
| 5,862,128 A | 1/1999 | Cooperman et al. | |
| 6,044,061 A * | 3/2000 | Aybay et al. | 370/230 |
| 6,275,508 B1 * | 8/2001 | Aggarwal et al. | 370/503 |
| 6,654,823 B2 * | 11/2003 | Soejima et al. | 710/52 |
| 7,305,047 B1 * | 12/2007 | Turner | 375/316 |
| 7,486,678 B1 * | 2/2009 | Devanagondi et al. | 370/394 |
| 7,715,419 B2 * | 5/2010 | Tatar et al. | 370/419 |
| 7,822,066 B1 * | 10/2010 | Blott et al. | 370/474 |
| 7,990,867 B1 * | 8/2011 | Keller et al. | 370/235 |
| 2005/0163120 A1 * | 7/2005 | Tachibana | 370/389 |
| 2005/0210185 A1 * | 9/2005 | Renick | 711/105 |
| 2011/0064084 A1 * | 3/2011 | Tatar et al. | 370/392 |
| 2013/0077500 A1 * | 3/2013 | Hutchison et al. | 370/252 |

OTHER PUBLICATIONS

U.S. Appl. No. 13/274,945, filed Oct. 17, 2011, Brebner.
U.S. Appl. No. 13/229,083, filed Sep. 9, 2011, Attig.
U.S. Appl. No. 12/858,416, filed Aug. 17, 2010, Attig et al.
U.S. Appl. No. 12/858,418, filed Aug. 17, 2010, Attig et al.
U.S. Appl. No. 12/858,421, filed Aug. 17, 2010, Attig et al.

* cited by examiner

Primary Examiner — Kevin Bates
Assistant Examiner — Nazia Naoreen
(74) Attorney, Agent, or Firm — LeRoy D. Maunu (57) ABSTRACT

A network packet processor includes a plurality of processing pipelines and a scheduling circuit. Each processing pipeline is configured and arranged to process packets having sizes less than or equal to an associated processing size of the processing pipeline. The respective processing size of one of the processing pipelines is different from the processing size of at least one other of the processing pipelines. The scheduling circuit is coupled to the plurality of processing pipelines and is configured and arranged to determine respective packet sizes of packets input from a bus. The scheduling circuit assigns each packet of the one or more packets for processing by one of the processing pipelines as a function of the respective packet size of the packet and the processing size associated with the one of the processing pipelines.

20 Claims, 4 Drawing Sheets

PARALLEL PROCESSING OF NETWORK PACKETS

FIELD OF THE INVENTION

One or more embodiments of the invention generally relate to communication protocols, and more particularly to packet processors for manipulating data packets.

BACKGROUND

With increasing telecommunications line rates, it is necessary to use increasingly wide hardware data buses in order to maintain throughput. For example, in FPGA implementations, a 512-bit data bus is typically used for 100 Gb/s packet processing, and a 2048-bit data bus for 400 Gb/s packet processing. One consequence is that it is increasingly likely that more than one packet can be contained in a set of bits traversing the data bus in parallel. As used herein, each set of bits transmitted over the full width of the data bus in parallel is referred to as a word.

As one example, given a minimum 64-bit packet size, portions of two packets may be included in a 512-bit word. A portion of a first data packet may end in the word and a portion of a second data packet may begin in the same 512-bit word. As another example, a single 2048-bit word may include portions of five data packets (one ending portion, three complete packets, and one beginning portion). As a result, to maintain throughput, parallel hardware may be needed to deal with the multiple packets in a single cycle. Parallel hardware is expensive in terms of required logic resources and power consumption.

Packet processing hardware is often organized as a pipeline to maintain throughput. Simple solutions employ multiple identical instances of packet processing hardware. If a maximum of k packets may be presented at once, then the packet processing hardware is replicated k times. In one parallelization approach, the entire data path is fanned-out into k independent hardware pipelines. Each pipeline is configured to extract data from the data path relevant to the packet it is handling. This approach is wasteful in terms of routing resources and power consumption since much redundant data is being sent to each pipeline. Another solution employs a single pipeline, with k parallel units at each stage. Although all data is still potentially made available to all units, there is just a single data path and the parallel units can be selective in tapping into the data path. The basic inefficiency with these approaches is that each of the k packet processing units is configured to handle a maximum-size data packet because each packet processing unit must be able to handle the worst case.

One or more embodiments may address one or more of the above issues.

SUMMARY

In one embodiment, a network packet processor is provided, which includes a plurality of processing pipelines and a scheduling circuit. Each processing pipeline is configured and arranged to process packets having sizes less than or equal to an associated processing size of the processing pipeline. The respective processing size associated with one of the processing pipelines is different from the processing size associated with at least one other of the processing pipelines. The scheduling circuit is coupled to the plurality of processing pipelines and is configured and arranged to determine respective packet sizes of one or more packets input in parallel to the network packet processor from a bus. The scheduling circuit assigns each packet of the one or more packets for processing by one of the processing pipelines as a function of the respective packet size of the packet and the processing size associated with the one of the processing pipelines. The respective packet size of each packet is less than or equal to the processing size associated with the assigned one of the processing pipelines.

In another embodiment, a method of processing packets is provided. One or more packets are received in parallel from a bus. Respective packet sizes of the one or more packets are determined and each packet is assigned to a respective one of a plurality of processing pipelines for processing. Assignment of packets is performed as a function of the respective packet size of the packet and a processing size of the processing pipelines. The processing size associated with one of the processing pipelines being different from the processing size associated with at least one other of the processing pipelines. The respective packet size of the packet being less than or equal to the processing size associated with the assigned one of the processing pipelines.

In yet another embodiment, a method of generating a network packet processing circuit is provided. A specification describing packet parameters is provided. The packet parameters include a bus width (N) and a minimum packet size of packets to be received via the bus. A number of processing pipelines (K) are determined based on the packet parameters. A processing size is determined for each of the K processing pipelines according to the packet parameters. The respective processing size associated with one of the processing pipelines is different from the processing size associated with at least one other of the processing pipelines. A circuit specification describing a network packet processor is generated. The network packet processor described in the circuit specification includes K processing pipelines and a scheduling circuit. Each processing pipeline is configured and arranged to process packets having a size greater than or equal to the associated processing size. The scheduling circuit is coupled to the K processing pipelines and is configured and arranged to determine respective packet sizes of one or more packets input in parallel from a bus and assign each packet of the one or more packets for processing by one of the K processing pipelines as a function of the respective packet size of the packet and the processing sizes associated the processing pipelines. The respective packet size of each packet is less than or equal to the processing size associated with the assigned one of the K processing pipelines.

BRIEF DESCRIPTION OF THE DRAWINGS

Various aspects and advantages of the invention will become apparent upon review of the following detailed description and upon reference to the drawings, in which.

DETAILED DESCRIPTION

One or more embodiments provide a hardware-efficient parallel architecture for a packet processing circuit. The packet processing circuit includes a plurality of processing pipelines for processing received packets in parallel. For current data bus widths (and for subsequent generations), typically there are multiple packets in a single word only when one or more of the packets is smaller than the maximum size packet. Therefore, all of the parallel units need not be capable of processing maximum size data packets. While previous solutions configure each pipeline to process maximum size packets, it is recognized that correct packet processing can be guaranteed while reducing the packet size that one or more processing pipelines is capable of processing. When the packet size that a processing pipeline is capable of processing is reduced to less than the maximum size packet, the processing pipeline may be implemented using less hardware. In this manner hardware costs may be reduced. The largest size packet that a processing pipeline is capable of processing is referred to herein as the processing size. In one or more embodiments, the processing pipelines are configured with different processing sizes.

In one or more embodiments, a processing size of each processing pipeline is determined based on criteria including parameters that specify limitations on the size, number, and format of packets that will be received on a data bus. Parameters may include: a number of bytes (N) contained in a word that is received in parallel over a bus, a maximum packet size of data packets that may be received over the bus, a minimum packet size (M) of data packets that may be received over the bus, a maximum number of data packets (K) that may be received in a word, a data lane width (Q) of the bus, etc. The data lane width Q defines offsets at which packets can begin in a received word. For example, if Q=1, a new data packet may begin at any byte offset of a received word; if Q=2, a new data packet may begin at every other byte; etc. Likewise, if Q=N, a packet can begin only at a word boundary.

It is understood that the packet parameters and size of processing pipelines may be received and/or determined in either bits or bytes of any size. For ease of explanation, the examples and embodiments are described with reference to bytes.

As an illustrative example, consider a data bus that is 256 bytes wide (i.e., N=256 bytes) and is configured to have a data lane width of 16 bytes (i.e., Q=16 bytes), and a minimum packet size of 64 bytes (i.e., M=64 bytes). For Q=16, a packet can begin only at byte 0, byte 15, byte 31, . . . , or byte 239. If two complete or partial packets are present in a received word, the smaller one can be no more than 128 bytes long. Likewise, if three complete or partial packets are present in a word, the smallest packet can be no more than 80 bytes long, and the next larger packet can be no more than 120 bytes long. If four complete or partial packets are present in a word, the smallest packet can be no more than 64 bytes long, the next larger packet can be no more than 80 bytes long, and the second largest packet can be no more than 112 bytes long. If five complete or partial packets are present in a word, the smallest packet can be no more than 48 bytes long, the next larger packet can be no more than 48 bytes long, the next larger packet can be no more than 80 bytes long, and the second largest packet can be no more than 96 bytes long.

For the preceding example, five different parallel packet processing pipelines with different processing sizes may be implemented. The different processing sizes are 256-byte, 128-byte, 80-byte, 64-byte, and 48-byte. In general, in a packet processor containing K processing pipelines, the $K^{th}$ unit may be provisioned to support processing a packet whose size does not exceed the greatest multiple of Q that is less than or equal to N/K.

Data packets are separated from a received word for parallel processing through a process referred to as packet extraction. Packet extraction involves shifting the relevant field of data corresponding to a packet out of the received word. When packet fields can occur at any packet offset and can also be of any size, a generic shifter is required. This can consume large amounts of logic resources, even with careful implementation. Referring back to the above example, without optimization there would be five units of packet extraction hardware, each equipped to shift over a range of 256 bytes. When processing size is optimized in accordance with one or more embodiments, the packet extraction hardware need only be implemented to perform maximum shift ranges of 256, 128, 80, 64, and 48 bytes. Accordingly, hardware needed for packet extraction can be reduced. Similarly, hardware used for processing extracted data packets in each processing pipeline may be optimized according to the determined processing size.

Figure 1:
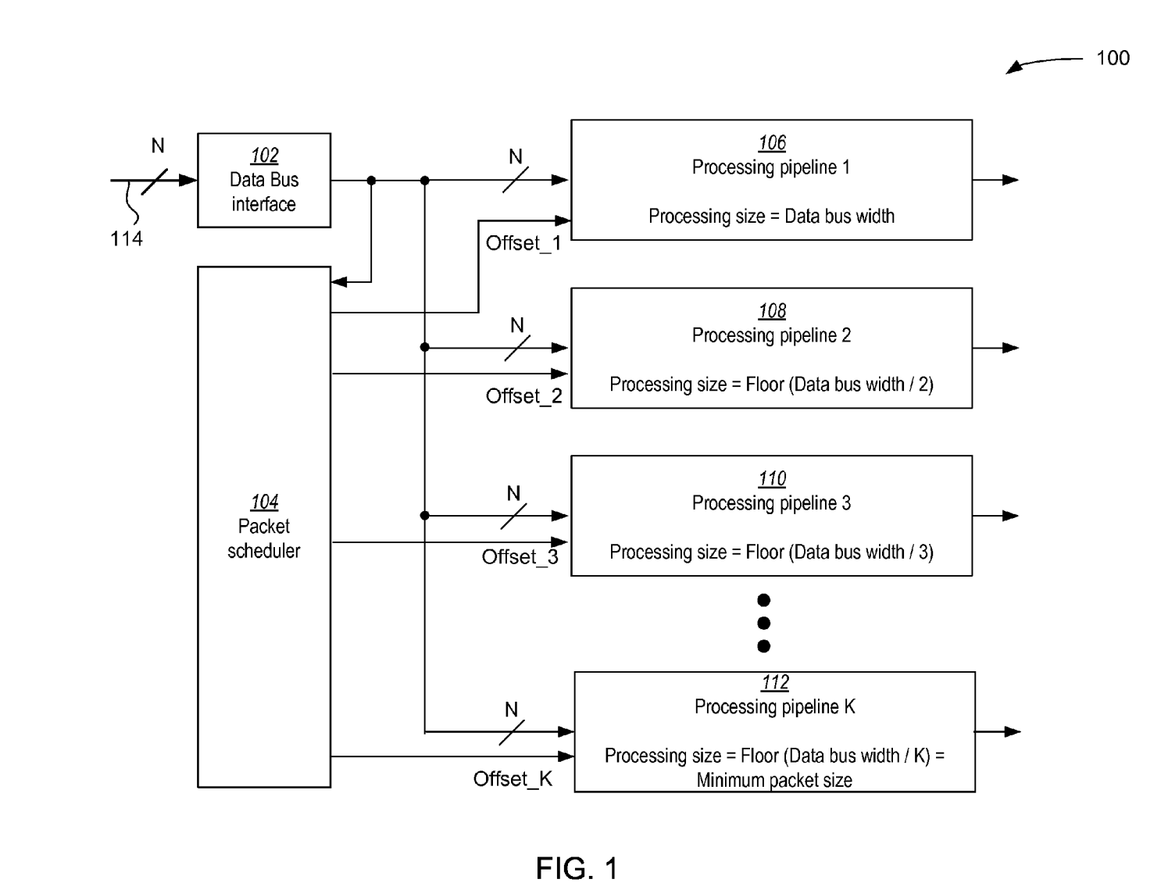
FIG. 1 shows an example network data packet processing circuit configured in accordance with one or more embodiments.

FIG. 1 shows an example network data packet processing circuit configured in accordance with one or more embodiments. Data packet processing circuit 100 includes a data bus interface circuit 102 configured to receive N-bytes in parallel from an N-byte bus 114. The circuit 100 includes K processing pipelines 106, 108, 110, and 112 that are configured and optimized, respectively, to have different processing sizes.

In one or more embodiments, the processing pipelines are implemented according to sizing criteria such that each processing pipeline L of the K processing pipelines (1<=L<=K) has a processing size that is greater than or equal to the bus byte width N divided by L. In one or more implementations, the processing size of each pipeline may be further reduced to the greatest multiple of Q that is less than or equal to N/L.

A scheduling circuit 104 is configured to analyze each N-byte word received by the data bus interface 102 from the N-byte data bus 114. The scheduling circuit 104 identifies packets contained in each word. For each identified packet, the scheduling circuit 104 determines an offset at which the packet starts in the N-byte word as well as a size of the identified packet. The scheduling circuit assigns each packet to a respective processing pipeline according to the determined size and the processing size that each processing pipeline is capable of processing.

Figure 2:
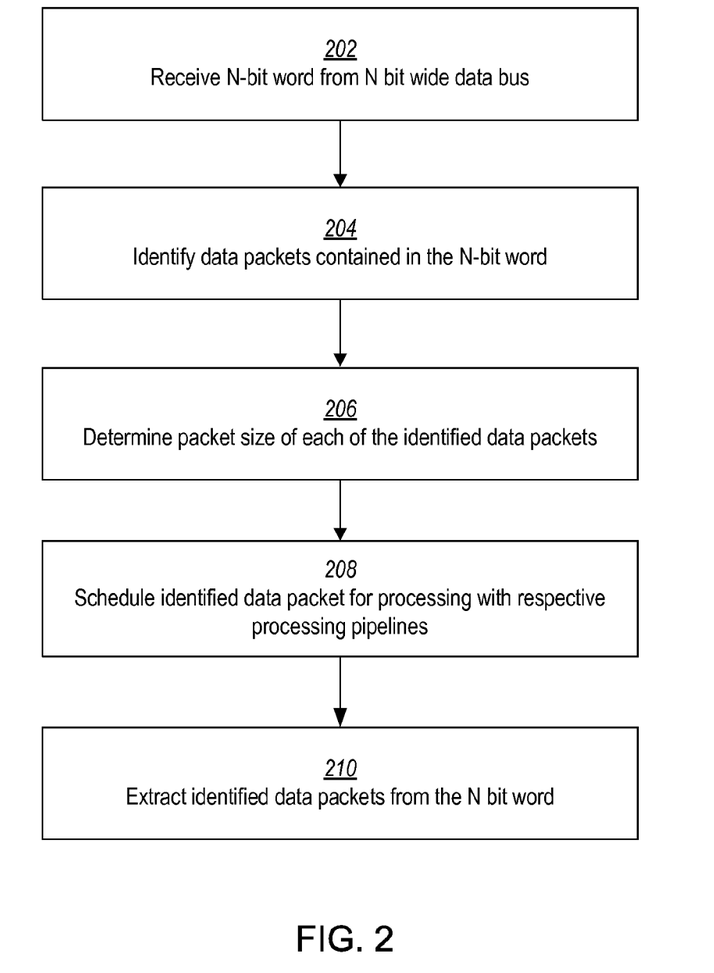
FIG. 2 shows a flowchart of a process for processing data packets.

FIG. 2 shows a flowchart of an example process of processing data packets received on a data bus. An N-byte word is received from an N-byte wide data bus at block 202. Data packets contained in the N-byte wide data bus are identified at block 204. A packet size of each of the identified data packets is determined at block 206. The identified data packets are scheduled for processing by respective processing pipelines at block 208.

Scheduling is performed as a function of data packet sizes, the respective processing sizes that the processing pipelines are capable of processing, and availability of the processing pipelines. The scheduling is performed in a manner to ensure that the packet processing units are capable of processing the assigned data packets. In one example scheduling implementation, data packets are sorted according to the determined packet sizes. The sorted packets may then be assigned to respective processing pipelines in descending order of packet size and descending order of processing size. Alternative scheduling algorithms may be used to implement the scheduling performed in block 208.

The identified data packets are extracted from the N-byte word at block 210. Extraction of identified data packets may be performed in a number of different ways using different architectures. In the embodiment shown in FIG. 1, each processing pipeline is configured to extract assigned data packets from the N-byte word received from the N-byte data bus. For example, the scheduling circuit may be configured to determine a size of each identified data packet (or partial data packet) and the offset of the data packet in the N-byte word and schedule the packet accordingly based on the determined size.

The scheduler block assigns each packet in the word to a processing pipeline according to the packet size and processing sizes of the pipelines. As each word enters the processing pipelines, the scheduler block provides offsets and sizes of the packets in the word to the corresponding processing pipelines. In response, each pipeline extracts a portion of the word indicated by the offset and size. When a processing pipeline is not required for a received word, a null offset value may be transmitted to the processing pipeline by the scheduling circuit. The null value may be a negative number or a positive number that is greater than the width of the bus, for example. Allocation of data packets to processing pipelines is possible so long as the pipelines are configured to have at least the capacity described above.

It is understood that one or more embodiments may extract packets by other methods. For example, in some embodiments the packet scheduling circuit may be configured to extract identified data packets and transmit the extracted packets to the respective assigned processing pipelines.

Data packets are scheduled by the scheduling circuit for every word received on the data bus. However, the scheduling circuit may not be able to accurately compute the packet size when each word is received. For example, when a packet begins in the current word but continues into a subsequent word, the size of the entire data packet may not be calculable until the next word is received. In general, both portions are needed to process the entire data packet. In some situations, a value indicating the packet size might be available at the start of packet and may be used to properly schedule the data packet. However, this is not always the case.

If the packet size is not available at the start of each packet, a first portion of a data packet may be assigned to a processing pipeline having a processing size that is less than the packet size. When a second portion of the packet is subsequently received, the packet processing circuit must be capable of processing the first and second portions in a processing pipeline of sufficient processing size. This scenario may be addressed in a number of ways.

In one approach, as discussed above, the sizing criteria may be used to reduce processing size of extraction logic of the pipelines, processing logic of pipelines, or both. In one embodiment, processing pipelines are configured with extraction circuits having reduced processing sizes according to the above sizing criteria, and processing circuitry of each pipeline having processing sizes capable of processing a maximum size (i.e., N-byte) data packet. In this manner, regardless of which pipeline a split data packet is assigned, the processing logic of the processing pipeline will be capable of processing the entire data packet when received.

In another approach, the processing pipelines may include two pipelines that are capable of processing maximum size (i.e., N-byte) data packets. Any packet that spans consecutive words is allocated to one of the N-byte processing pipelines. This ensures that maximum size data packets which continue over two words can be processed even if initially scheduled to a smaller processing pipeline. In one or more other embodiments, data packets may be dynamically rescheduled among the processing pipelines. In such embodiments, the processing pipelines are configured to pass context information and other intermediated data between pipelines. This allows a first pipeline to receive a first portion of a data packet and a second pipeline to process a second portion of the data packet.

Figure 3:
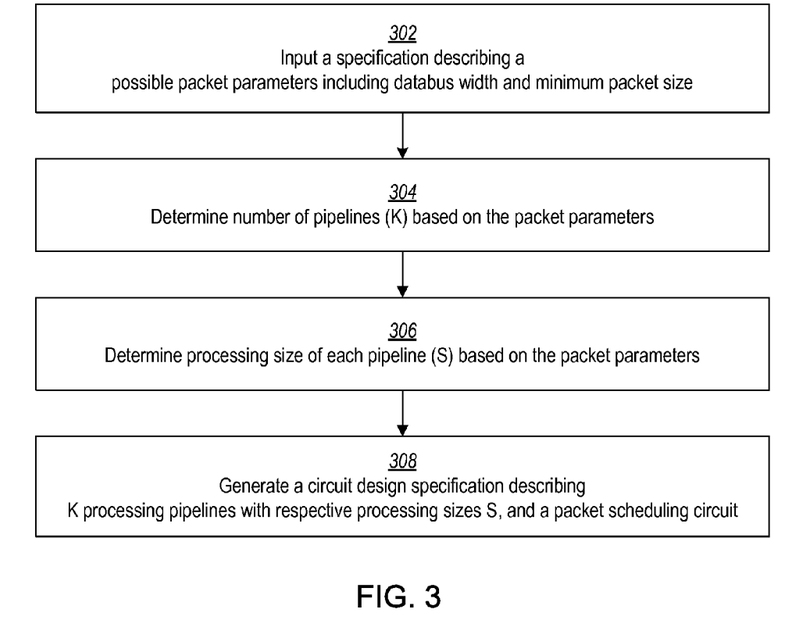
FIG. 3 shows a flowchart of a process for generating a network data packet processing circuit configured in accordance with one or more embodiments.

In one or more embodiments, a software design tool may be configured to generate and configure a network data packet processing circuit as described above. FIG. 3 shows a flowchart of a process for generating a network data packet processing circuit design. A specification describing possible packet parameters is input at block 302. In this example implementation, the packet parameters include the width, N, of the data bus and a minimum packet size M. A number of pipelines K needed to process received data packets under a worst case scenario (i.e. all packets having the minimum packet size) is determined at block 304. The processing size of each of the K pipelines is determined at block 306 based on the packet parameters and the determined number of pipelines K. As discussed above, the number of pipelines K is equal to the maximum number of data packets that may be received in a word. Processing size is determined such that each processing pipeline L of the K processing pipelines ($1<=L<=K$) has a processing size that is greater than or equal to the bus byte width N divided by L. In one or more implementations, the processing size of each pipeline may be further reduced to be equal to the greatest multiple of Q that is less than or equal to N/L.

A hardware descriptive language (HDL) circuit design specification, such as Verilog or VHDL, is generated at block 308. The circuit design specification describes a packet processor having K processing pipelines with respective maximum packet sizes S. The circuit design also includes a packet scheduling circuit configured to identify incoming data packets in words received on a data bus and dynamically schedule each of the packets on a respective one of the K processing pipelines according to the sizes of the identified data packets and processing sizes of the processing pipelines. The processing pipelines and/or packet scheduling circuit may be described by or constructed from predefined circuit design specifications. For example, each process pipeline may be generated by instantiating a number of predefined modules according to the required packet size processing capability.

Figure 4:
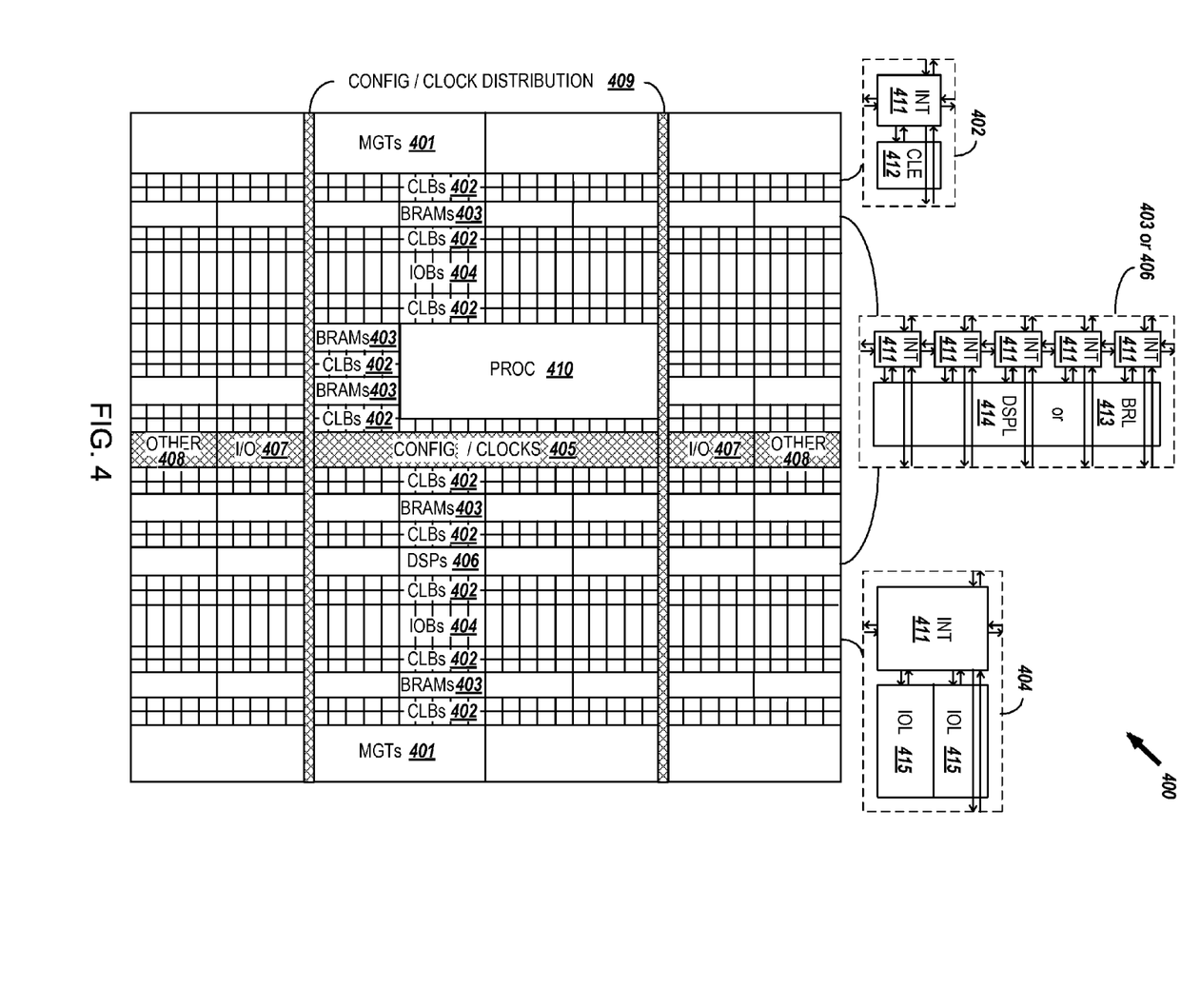
FIG. 4 shows a programmable integrated circuit that may be configured to implement a data packet processing circuit in accordance with one or more embodiments.

FIG. 4 is a block diagram of an example programmable integrated circuit that may be configured to implement a packet processor in accordance with various embodiments. The programmable integrated circuit shown in FIG. 4 is known as a field programmable gate array (FPGA). A packet processing circuit, as previously described, may be implemented on the programmable logic and interconnect resources of the FPGA.

FPGAs can include several different types of programmable logic blocks in the array. For example, FIG. 4 illustrates an FPGA architecture (400) that includes a large number of different programmable tiles including multi-gigabit transceivers (MGTs 401), configurable logic blocks (CLBs 402), random access memory blocks (BRAMs 403), input/output blocks (IOBs 404), configuration and clocking logic (CONFIG/CLOCKS 405), digital signal processing blocks (DSPs 406), specialized input/output blocks (I/O 407), for example, e.g., clock ports, and other programmable logic 408 such as digital clock managers, analog-to-digital converters, system monitoring logic, and so forth. Some FPGAs also include dedicated processor blocks (PROC 410) and internal and external reconfiguration ports (not shown).

In some FPGAs, each programmable tile includes a programmable interconnect element (INT 411) having standardized connections to and from a corresponding interconnect element in each adjacent tile. Therefore, the programmable interconnect elements taken together implement the programmable interconnect structure for the illustrated FPGA. The programmable interconnect element INT 411 also includes the connections to and from the programmable logic element within the same tile, as shown by the examples included at the top of FIG. 4.

For example, a CLB 402 can include a configurable logic element CLE 412 that can be programmed to implement user logic plus a single programmable interconnect element INT 411. A BRAM 403 can include a BRAM logic element (BRL 413) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 406 can include a DSP logic element (DSPL 414) in addition to an appropriate number of programmable interconnect elements. An IOB 404 can include, for example, two instances of an input/output logic element (IOL 415) in addition to one instance of the programmable interconnect element INT 411. As will be clear to those of skill in the art, the actual I/O pads connected, for example, to the I/O logic element 415 are manufactured using metal layered above the various illustrated logic blocks, and typically are not confined to the area of the input/output logic element 415.

In the pictured embodiment, a columnar area near the center of the die (shown shaded in FIG. 4) is used for configuration, clock, and other control logic. Horizontal areas 409 extending from this column are used to distribute the clocks and configuration signals across the breadth of the FPGA.

Some FPGAs utilizing the architecture illustrated in FIG. 4 include additional logic blocks that disrupt the regular columnar structure making up a large part of the FPGA. The additional logic blocks can be programmable blocks and/or dedicated logic. For example, the processor block PROC 410 shown in FIG. 4 spans several columns of CLBs and BRAMs.

Note that FIG. 4 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 4 are purely exemplary. For example, in an actual FPGA more than one adjacent column of CLBs is typically included wherever the CLBs appear, to facilitate the efficient implementation of user logic.

Figure 5:
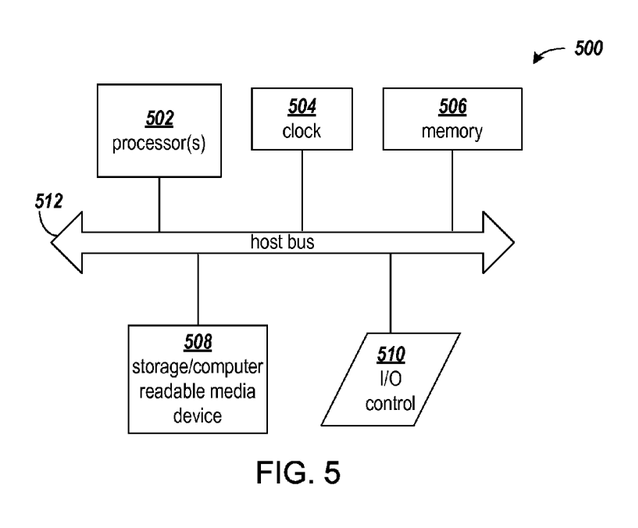
FIG. 5 shows a computer architecture that may be configured to implement the processes and functions described herein.

FIG. 5 shows a block diagram of an example computing arrangement that may be configured to implement the processes and functions described herein. It will be appreciated that various alternative computing arrangements, including one or more processors and a memory arrangement configured with program code, would be suitable for hosting the processes and data structures and implementing the algorithms of the different embodiments. The computer code, comprising the processes of one or more embodiments encoded in a processor executable format, may be stored and provided via a variety of computer-readable storage media or delivery channels such as magnetic or optical disks or tapes, electronic storage devices, or as application services over a network.

Processor computing arrangement 500 includes one or more processors 502, a clock signal generator 504, a memory unit 506, a storage unit 508, and an input/output control unit 510 coupled to a host bus 512. The arrangement 500 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor 502 may be one or more general purpose processors, or a combination of one or more general purpose processors and suitable co-processors, or one or more specialized processors (e.g., RISC, CISC, pipelined, etc.).

The memory arrangement 506 typically includes multiple levels of cache memory, and a main memory. The storage arrangement 508 may include local and/or remote persistent storage such as provided by magnetic disks (not shown), flash, EPROM, or other non-volatile data storage. The storage unit may be read or read/write capable. Further, the memory 506 and storage 508 may be combined in a single arrangement.

The processor arrangement 502 executes the software in storage 508 and/or memory 506 arrangements, reads data from and stores data to the storage 508 and/or memory 506 arrangements, and communicates with external devices through the input/output control arrangement 510. These functions are synchronized by the clock signal generator 504. The resource of the computing arrangement may be managed by either an operating system (not shown), or a hardware control unit (not shown).

The embodiments of the present invention are thought to be applicable to a variety of packet processors. Other aspects and embodiments will be apparent to those skilled in the art from consideration of the specification and practice of the invention disclosed herein. The embodiments may be implemented as one or more processors configured to execute software, as an application specific integrated circuit (ASIC), or as a logic on a programmable logic device. It is intended that the specification and illustrated embodiments be considered as examples only, with a true scope of the invention being indicated by the following claims.

What is claimed is:

1. A network packet processor, comprising:
   a plurality of processing pipelines, each processing pipeline configured and arranged to process packets having sizes less than or equal to an associated processing size;
   wherein the respective processing size associated with one of the processing pipelines is different from the processing size associated with at least one other of the processing pipelines;
   wherein each processing size is a largest size packet that the associated processing pipeline is capable of processing; and
   a scheduling circuit coupled to the plurality of processing pipelines, the scheduling circuit configured and arranged to:
   determine respective packet sizes of one or more packets input in parallel to the network packet processor from a bus; and
   assign each packet of the one or more packets for processing by one of the processing pipelines as a function of the respective packet size of the packet and the processing size associated with the one of the processing pipelines, wherein the respective packet size of the packet is less than or equal to the processing size associated with the one of the processing pipelines.

2. The network packet processor of claim 1, wherein:
the bus is an N-byte bus; and
the plurality of processing pipelines includes a number of processing pipelines, K, that is greater than N divided by a minimum packet size of packets input to the network packet processor.

3. The network packet processor of claim 2, wherein the processing size associated with each processing pipeline, L, $0 < L \leq K$, is greater than or equal to N divided by L.

4. The network packet processor of claim 3, wherein:
the bus has a lane width Q; and
the processing size of each processing pipeline L is equal to the maximum packet size divided by L rounded down to the nearest multiple of Q.

5. The network packet processor of claim 1, wherein the scheduling circuit, in assigning each of the one or more packets to a respective processing pipeline, is further configured and arranged to:
sort the one or more packets according to packet sizes; and
assign the sorted packets in descending order of packet sizes to processing pipelines in descending order of associated processing sizes.

6. The network packet processor of claim 2, wherein the scheduling circuit is further configured and arranged to:
determine a respective offset of the N-byte bus for each of the one or more packets;
determine a respective size for each of the one or more packets; and
send the offset and size of each of the one or more packets to the one of the processing pipelines to which the packet is assigned.

7. The network packet processor of claim 6, wherein the scheduling circuit is configured and arranged to send a null offset value to processing pipelines that are not assigned a packet.

8. The network packet processor of claim 6, wherein each of the K processing pipelines is configured and arranged to receive N bytes from the N-byte bus, and in response to being assigned one of the one or more packets, to extract the assigned packet from the N bytes using the respective offset and size.

9. The network packet processor of claim 8, wherein each processing pipeline includes an extraction circuit configured and arranged to extract a number of bytes less than or equal to the processing size of the processing pipeline.

10. The network packet processor of claim 2, wherein the scheduling circuit is further configured and arranged to:
extract each of the one or more packets from the N-byte bus; and
send each of the extracted packets to the one of the processing pipelines.

11. A method of processing packets, comprising:
receiving one or more packets in parallel from a bus;
determining respective packet sizes of the one or more packets; and
assigning each packet of the one or more packets for processing by one of a plurality of processing pipelines as a function of the respective packet size of the packet and a processing size associated with the one of the plurality of processing pipelines;
wherein each processing size is a largest size packet that the associated processing pipeline is capable of processing;
wherein the processing size associated with the one of the processing pipelines is different from the processing size associated with at least one other of the processing pipelines; and
wherein the respective packet size of the packet is less than or equal to the processing size associated with the one of the processing pipelines.

12. The method of claim 11, wherein:
the bus is an N-byte bus; and
the plurality of processing pipelines includes a number of processing pipelines (K) greater than N divided by a minimum packet size.

13. The method of claim 11, wherein the assigning each of the one or more packets to a respective processing pipeline includes:
sorting the one or more packets according to packet size; and
assigning the sorted packets in descending order of packet sizes to respective ones of the processing pipelines in descending order of associated processing sizes.

14. The method of claim 12, wherein the processing size of each processing pipeline (L), $0 < L \leq K$, is greater than or equal to N divided by L.

15. The method of claim 14, wherein:
the bus has a lane width Q, and
the processing size of each processing pipeline L is equal to the maximum packet size divided by L rounded down to the nearest multiple of Q.

16. The method of claim 12, further comprising:
determining a respective offset of the N-byte bus for each of the packets;
determining a respective size for each of the packets; and
sending the offset and size of each packets to a respective one of the processing pipelines to which the packet is assigned.

17. The method of claim 16, further comprising,
for each set of N bytes received from the N-byte bus, providing the set of N-bytes to each of the processing pipelines; and
for each packet assigned for processing by one of the processing pipelines, extracting the packet from the set of N bytes, using the processing pipeline, according to the corresponding offset and size.

18. The method of claim 12, further comprising:
extracting each of the one or more packets from N bytes received from the N-byte bus; and
sending each of the extracted data packets to the one of a plurality of processing pipelines.

19. A method of generating a network packet processing circuit, comprising:
inputting a specification describing packet parameters including a bus width (N) and a minimum packet size of packets to be received via the bus;
determining a number of processing pipelines (K) based on the packet parameters;
determining a processing size for each of the K processing pipelines according to the packet parameters;
wherein the respective processing size associated with one of the processing pipelines is different from the processing size associated with at least one other of the processing pipelines;
wherein each processing size is a largest size packet that the associated processing pipeline is capable of processing; and
generating a circuit specification describing a packet processor including:

K processing pipelines, each processing pipeline configured and arranged to process packets having a size greater than or equal to the associated processing size; and a scheduling circuit coupled to the K processing pipelines, the scheduling circuit configured and arranged to:

determine respective packet sizes of one or more packets input in parallel from a bus; and assign each packet of the one or more packets for processing by one of the K processing pipelines as a function of the respective packet size of the packet and the processing size associated with the one of the processing pipelines, wherein the respective packet size of the packet is less than or equal to the processing size associated with the one of the K processing pipelines.

20. The method of claim 19, wherein:

the determined number of processing pipelines (K) is greater than N divided by a minimum packet size; and the determined processing size for each of the K processing pipelines (L), $0 < L \leq K$, is greater than or equal to N divided by L.

\* \* \* \* \*